United States Patent
Xue et al.

(10) Patent No.: US 8,260,312 B2
(45) Date of Patent: Sep. 4, 2012

(54) METHOD AND APPARATUS FOR LOCATION REQUEST TRACKING

(75) Inventors: Hao Xue, Ottawa (CA); M. Khaledul Islam, Ottawa (CA)

(73) Assignee: Research In Motion Limited, Waterloo, Ontario (CA)

( * ) Notice: Subject to any disclaimer, the term of this patent is extended or adjusted under 35 U.S.C. 154(b) by 272 days.

(21) Appl. No.: 12/388,782

(22) Filed: Feb. 19, 2009

(65) Prior Publication Data

US 2010/0210281 A1    Aug. 19, 2010

(51) Int. Cl.
*H04W 24/00* (2009.01)

(52) U.S. Cl. ............... 455/456.1; 455/404.1; 455/404.2; 455/414.1; 455/414.2; 455/435.2

(58) Field of Classification Search ............... 455/456.1, 455/404.1, 404.2, 414.1, 414.2, 435.2
See application file for complete search history.

(56) References Cited

U.S. PATENT DOCUMENTS

| | | | | |
|---|---|---|---|---|
| 2006/0099970 A1* | 5/2006 | Morgan et al. | ............. | 455/456.6 |
| 2006/0135174 A1 | 6/2006 | Kraufvelin et al. | | |
| 2007/0178915 A1* | 8/2007 | Khan | ............. | 455/457 |
| 2010/0114488 A1* | 5/2010 | Khamharn et al. | ............. | 701/300 |

FOREIGN PATENT DOCUMENTS

WO   WO2008/089635   * 7/2008

OTHER PUBLICATIONS

3GPP TS 22.071V8.0.0; 3rd Generation Partnership Project; Technical Specification Group Services and System Aspects; Location Services (LCS); Service Description; Stage 1; Release 8; Dec. 2007; 51 pgs.
3GPP TS 23.271V7.9.0; 3rd Generation Partnership Project; Technical Specification Group Services and System Aspects; Functional Stage 2 Description of Location Services (LCS); Release 7; Sep. 2007; 145 pgs.
European Examination Report; EP Application No. 10154165.4; Apr. 4, 2011; 8 pages.
European Summons to Attend Oral Proceedings; Application No. 10154165.4; Oct. 27, 2011; 7 pages.
Foreign Communication From a Related Counterpart Application—Extended European Search Report, EP 10154165.4, Apr. 27, 2010, 7 pages.
Research In Motion Limited; European Patent Application No. 10154165.4; EPO Communication re: Decision to Refuse a European Patent Application; Apr. 20, 2012; 15 pgs.

* cited by examiner

*Primary Examiner* — Kamran Afshar
*Assistant Examiner* — Manpreet Matharu
(74) *Attorney, Agent, or Firm* — Conley Rose, P.C.; J. Robert Brown, Jr.

(57) ABSTRACT

A method and apparatus for tracking location requests. The apparatus includes a storage device; a display and a processor configured to receive a location request and write location request data to a storage device.

17 Claims, 4 Drawing Sheets

METHOD AND APPARATUS FOR LOCATION REQUEST TRACKING

BACKGROUND

As used herein, the terms "user equipment" and "UE" might in some cases refer to mobile devices such as mobile telephones, personal digital assistants, handheld or laptop computers, and similar devices that have telecommunications capabilities. Such a UE might consist of a UE and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might consist of the device itself without such a module. In other cases, the term "UE" might refer to devices that have similar capabilities but that are not transportable, such as desktop computers, set-top boxes, or network appliances. The term "UE" can also refer to any hardware or software component that can terminate a communication session for a user. Also, the terms "user agent," "UA," "user equipment," "UE," "user device" and "user node" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE). For example, an LTE system might include an enhanced node B (eNB), a wireless access point, or a similar component rather than a traditional base station. As used herein, the term "access node" will refer to any component of the wireless network, such as a traditional base station, a wireless access point, or an LTE eNB, that creates a geographical area of reception and transmission coverage allowing a user equipment (UE) or a relay node to access other components in a telecommunications system.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
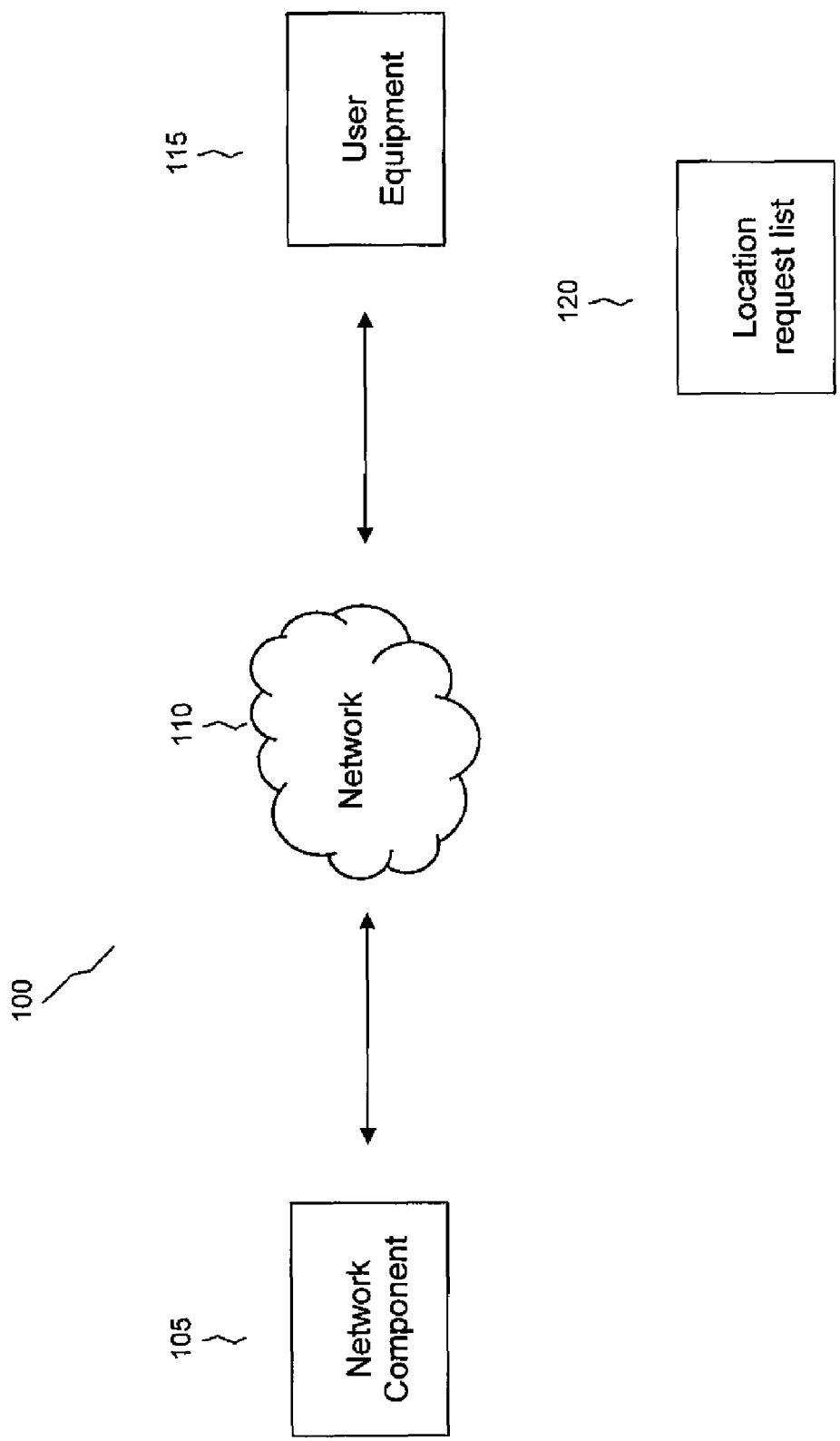
FIG. 1 is a diagram illustrating a system suitable for implementing an embodiment of the present disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Location services are presently available to users of wireless communication networks. These services may include global positioning satellite (GPS) based tracking and other methods of triangulation used to determine the location of the UE. A UE location request may be made for various reasons and by various entities, such as, but not limited to, by a vendor offering coupons to customers traveling nearby. The vendor might make arrangements with a telecommunications network provider to obtain location information on certain customers of the telecommunication network provider that are interested in receiving such offers.

Location requests may be handled differently depending upon the settings or preferences selected by the user or network provider. For example, a user may be notified of an incoming location request and may either approve or deny the location request. If the user is unavailable to respond to the location request, the location request might be automatically approved. In other cases, the user may be notified of an incoming location request, but might not be provided with the option to control the location request. In this instance the location service may start automatically.

In some cases, the user may not want to provide location information under any circumstances, and so all location requests might be denied. In this instance, location requests might stop at the network and no notification would be sent to the user. In still another instance, the user might be outside of signal coverage and so the location request would be received by the network but again no notification would be sent to the user.

It can be seen that there are many different scenarios and outcomes involving handling UE location requests. In any case, the user may want to be made aware of the various requests by others for the user's location. The user may be interested in knowing the requestor's identity, time of the request, and other information related to the location request. The user may also want to know about location requests that were not transmitted to the UE, such as when the user was out of coverage. Additionally, the user may want to cancel an ongoing location service that is tracking or providing location information about the user to the third party requester. The present disclosure provides systems and methods for monitoring location requests, as well as the requestor of the location service and other related information. Further, the present disclosure enables the user to cancel active or ongoing requests for the user's location.

FIG. 1 is a diagram illustrating a system 100 suitable for implementing one or more embodiments disclosed herein. The system 100 includes a network component 105, a user equipment (UE) 115, and a network 110 to promote connection there between. The connection between the network component 105, the network 110 and the UE 115 may be via wired or wireless links.

The network component 105 may be one or more computer systems or servers, for example, of a service provider or otherwise that receives a location request related to the UE 115. The network component may forward the location request to the UE 115. The network component 105 may also store location request data related to the received location request.

The network 110 may use a Third Generation Partnership Project (3GPP) technology, an LTE technology, or some other technology. Internet protocols (IP) IPV4, IPV6, GPRS Tunneling Protocol (GTP), and/or other current or future protocols may be supported by these technologies. In addition, the network 110 may be serviced by any or a combination of Internet Protocol-based networks, packet-based networks, public-switched telecom networks, and/or integrated services digital networks. The network 110 may be wired, wireless or both and may implement any known or after-developed network technology.

The UE 115 is operable for implementing aspects of the disclosure, but the disclosure should not be limited to these implementations. The UE 115 may take various forms including a mobile phone, a wireless handset, a pager, a personal digital assistant (PDA), a portable computer, a tablet computer, or a laptop computer. Many suitable devices combine some or all of these functions. In some embodiments of the disclosure, the UE 115 is not a general purpose computing device like a portable, laptop or tablet computer, but rather is a special-purpose communications device such as a mobile phone, wireless handset, pager, or PDA.

in an embodiment, the UE user or network may have configured preferences such that the UE user may receive notification of location requests via the UE 115. In such an embodiment, the network component 105 receives a location request from the third party requestor, checks the UE user preferences on the network, and then forwards the location request to the UE 115. The UE user may then approve or deny the location request via the UE 115. When the UE user is away from the UE 115 and not available to respond to the request, the request may be automatically approved or denied based upon the UE user or network preferences. In any case, the location request data, including whether the request was approved or denied, may be written to a storage device on the UE 115, network or both.

In another case, the UE user may not receive a notification of a location request. For example, the UE 115 may be outside of signal coverage and therefore will not receive a notification. The UE user or network may also configure preferences so that the UE user will not receive any notice. For example, the preference may be set to automatically approve or deny all location requests without providing notification to the user of the UE.

In some embodiments, all the location request data may be stored on the network component 105, while in other embodiments the location request data may be stored exclusively on the UE 115. The location request data may stored in a location request list 120 on the UE 115 or the network component 105 or both. Whether stored on the UE 115 or the network component 105, the UE user may review the location request data via the UE 115. When the UE user wished to review location requests, the location request data would be retrieved from the appropriate location for viewing and management on the UE 115.

In other embodiments, all or some portions of the location request data may be stored on both the network component 105 and UE 115. In this case, the UE 115 may retrieve the location request data stored on the network component 105 via the network 110. The UE 115 may combine the retrieved location request data with location request data stored locally on the UE 115. The resulting combined list is then displayed to the UE user via the UE 115. When stored in this manner, the location request data stored on the network component 105 and the UE 115 may automatically or periodically be synchronized. For example, synchronization may be accomplished via the network 110 or some other means of transferring data between the UE 115 and network equipment 105.

The location request data may include the location request, the identification of the requestor of the UE's location, the time of receipt of the location request, the UE user's response to the verification notification, the location information provided to the requester, and any other information related to the location request. The identification of the requestor may be a telephone number, name or other identifier.

The location request data may also include the status of the location service, for example: active, complete, or denied. An active location service is actively tracking the UE 115 location. A complete location service has tracked or otherwise provided the UE 115 location, but is currently not tracking the UE 115 location. A denied location service is where no location information about the UE 115 was provided. The UE user may view, such as via a user interface provided on a display of the UE 115, the location information including the status of the location service. In some embodiments, the user may have the option to cancel active location services via the user interface. Upon selection, the location service would be discontinued and the third party would no longer receive location information related to the UE 115. The UE user may also view, via a user interface, the other location information including the identity of the requestor of the location requests. Upon viewing the identity of the requester of the location requests, the UE user may be provide with the option to readily contact the requester of the particular location request via the UE 115 such as via text messaging or a voice call.

The following is exemplary of the operation of the location request tracking system of the present disclosure according to one embodiment. The UE may receive a location request and then write the location request data to storage on the UE. The location request may be set to require verification. The location request information, along with an option to approve or deny the request, may be displayed in a graphical user interface (GUI) via the display on the UE. The UE user may then approve or deny the location request. The UE may then update the location request data written to storage based upon the input received from the UE user. The UE may display via the GUI a history of location request data. The history of location request data may also contain active, such as ongoing, location services. The GUI may provide the user with the option to cancel an active location service. In other cases the UE user may not be provided with the option to cancel an active location service. Certain location services may not be displayed in the history of location request data, as may be required under law or by regulation or otherwise as described further below.

The location request may include a privacy setting. The privacy setting may be selected from Third Generation Partnership Project (3GPP) Technical Specification (TS) 23.271 v7.9.0, which is incorporated herein by reference for all purposes. The privacy setting may be used to determine how location requests will be handled, including whether the UE 115 may notify the UE user of the incoming location request. The settings described in 3GPP TS 23.271 include the following:

Positioning is not allowed (no notification sent to UE)
Positioning is allowed without notification to UE
Positioning allowed with notification to the UE
Positioning requires notification and verification by the UE user; positioning is allowed if granted by the UE user or if there is no response from the user
Positioning requires notification and verification by the UE user; positioning is allowed only if granted by the UE user There may be instances where the UE privacy settings are overridden. For example, emergency call locators, such as 911 operators, may track the UE location regardless of the privacy settings that have been selected. In addition, certain government agencies may be allowed by law to track the UE regardless of the UE privacy settings. In the case where the privacy settings are overridden, the UE user might not be notified of previous or ongoing location services.

It should be appreciated that the functionality provided by the present disclosure for tracking and managing location services requests may be, in some embodiments, provided by an application and GUI (implemented as software or otherwise) that is provided on and executable solely by the UE 115. In other embodiments, some or all of these features and capabilities may be provided by the network component 105.

Figure 2:
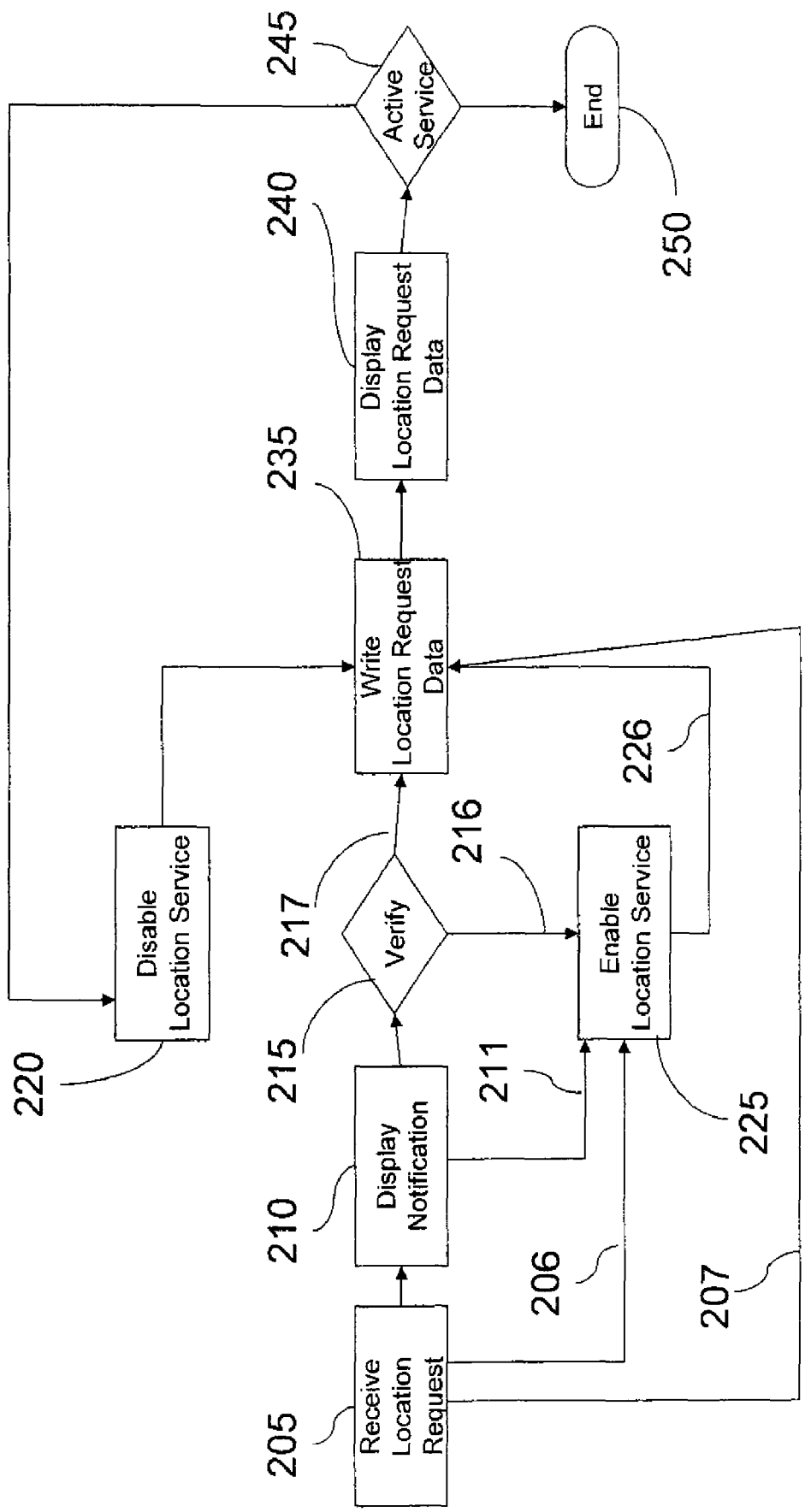
FIG. 2 illustrates a block diagram of a method for tracking and monitoring location requests according to an embodiment of the present disclosure.

FIG. 2 illustrates a block diagram of a method for tracking location requests according to an embodiment of the present disclosure. The method begins at block 205 when the network component 105 receives a location request and checks the privacy setting. The privacy setting may be set to notify the UE user, or perhaps it may be set not to notify the UE user of location requests.

When the privacy setting is such that no notification is provided to the user, location requests may be automatically approved or denied. In that case, the privacy setting may be set to accept all location requests without notification. In this case, as indicated by line 206, the method continues by enabling the location service at block 225. In another case, the privacy setting is such that location information is never provided to requesters. In this case, the network component 105 does not enable the location service, but writes location request data to storage in block 235, as indicated by line 207.

When the privacy setting is set to notify the user, the method continues at block 210 where a notification is sent to the UE 115 after receiving a location request at block 205. In some instances, the privacy setting may be set to accept all location requests with notification. As such, after the UE 115 displays a notification in block 210, the UE 115 then enables the location service at block 225, as indicated by line 211.

In another case, the privacy setting may be set to require notification and verification, wherein positioning is allowed if verified, or if there is no response to the request. For example, the UE user may not notice the verification request and therefore may not respond to the request in a timely manner. In this case, after the UE 115 displays a notification at block 210, the UE user may approve or deny the location request at block 215 via the UE 115. If the location request is approved or no response to the verification request is made within a certain time, the location service is enabled in block 225, as indicated by line 216. If the location request is denied, the location service is not enabled and the location request data is written in block 235, as indicated by line 217. Deny or disapprove, as used herein, requires the UE user to take an action to deny the location request.

In another case, the privacy setting may be set to require notification and verification, wherein positioning is allowed only if verified. For example, the UE user may not notice the verification request and therefore may not respond to the request in a timely manner. In this case, after the UE 115 displays a notification in block 210, the UE user may approve or deny the location request at block 215 via the UE 115. If the location request is approved, the location service is enabled in block 225, as indicated by line 216. If the location request is denied or no response to the verification request is made within a certain time, the location service is not enabled and the location request data is written in block 235, as indicated by line 217.

After the location service is enabled in block 225, the location request data is written to storage in block 235, as indicated by line 226. Storage in block 235 may be secondary storage 450, RAM 430, or ROM 440 as described in FIG. 4 hereafter. The storage may be part of a network component 105 or a UE 115.

After location request data is written in block 235, the location request data may be retrieved from storage and displayed in block 240. The location request data may contain the status of the location services such as whether they are active. The UE user via the UE 115 may be presented with the option to cancel an active location service at block 245. If the UE user decides to cancel an active location service via the UE 115, the active service is disabled in block 220. If the location service is disabled, the location request data for that location service is written in block 235. If the UE user displays the data in block 240 via the UE 115 and takes no action in block 245, the method ends at block 250.

The location request may also contain a service type as defined in 3GPP TS 22.071, which is incorporated herein by reference for all purposes. For example, the service type may be set to "person tracking" or "navigation". The location request may also contain a location type. For example the location type may be set to "current location" or "last known location."

After viewing the location request data which may include the identification of the requestor of the location request, the UE user may also be presented via the UE 115 the option to contact the requester via the UE 115. For example, the UE user may not recognize the identity of a requester and may wish to contact the requestor to verify the requestor's identity.

Figure 3:
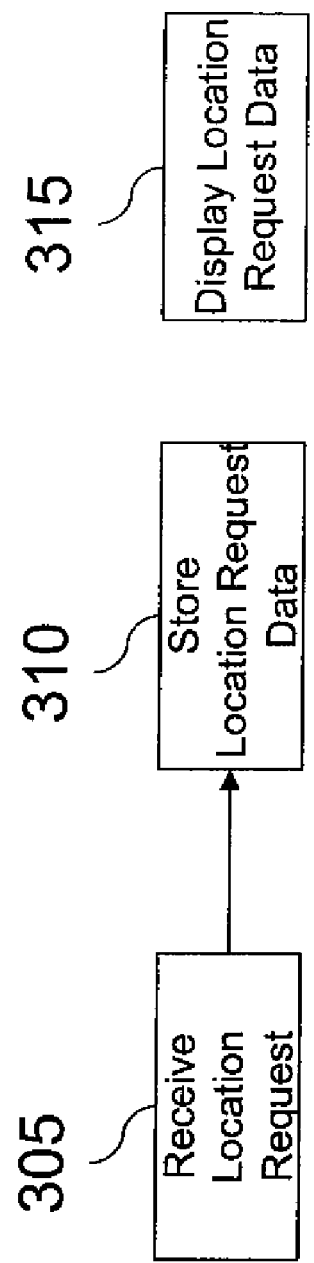
FIG. 3 illustrates a block diagram of a method for tracking location requests according to an embodiment of the present disclosure

FIG. 3 is a block diagram illustrating a method for tracking location requests. A location request is received at block 305. Location request data is written to storage at block 310. The location request data is displayed at block 315.

Figure 4:
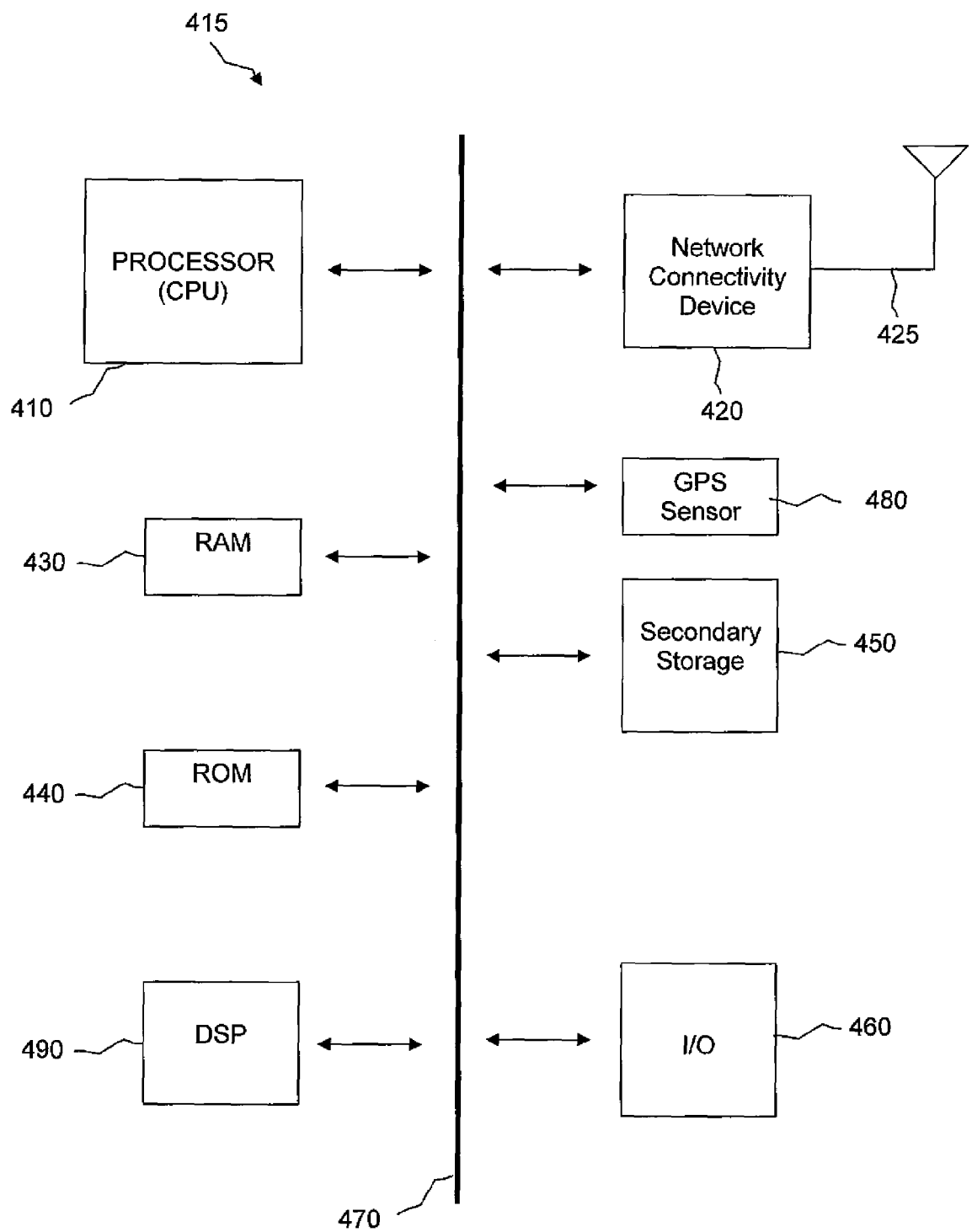
FIG. 4 is a diagram illustrating a system suitable for implementing an embodiment of the present disclosure.

FIG. 4 is a diagram illustrating an example of a system 415 that includes a processor 410 suitable for implementing one or more embodiments disclosed herein. In addition to the processor 410 (which may be referred to as a central processor unit or CPU), the system 415 might include network connectivity devices 420, random access memory (RAM) 430, read only memory (ROM) 440, secondary storage 450, Global Positioning Satellite (GPS) sensor 480, and input/output (I/O) devices 460. These components might communicate with one another via a bus 470. In some cases, some of these components may not be present or may be combined in various combinations with one another or with other components not shown. These components might be located in a single physical entity or in more than one physical entity. Any actions described herein as being taken by the processor 410 might be taken by the processor 410 alone or by the processor 410 in conjunction with one or more components shown or not shown in the drawing, such as a digital signal processor (DSP) 490. Although the DSP 490 is shown as a separate component, the DSP 490 might be incorporated into the processor 410.

The processor 410 executes instructions, codes, computer programs, or scripts that it might access from the network connectivity devices 420, RAM 430, ROM 440, or secondary storage 450 (which might include various disk-based systems such as hard disk, floppy disk, or optical disk). While only one CPU 410 is shown, multiple processors may be present. Thus, while instructions may be discussed as being executed by a processor, the instructions may be executed simultaneously, serially, or otherwise by one or multiple processors. The processor 410 may be implemented as one or more CPU chips.

The network connectivity devices 420 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 420 may enable the processor 410 to communicate with the Internet or one or more telecommunications networks or other networks from which the processor 410 might receive information or to which the processor 410 might output information. The network connectivity devices 420 might also include one or more transceiver components 425 capable of transmitting and/or receiving data wirelessly.

The RAM 430 might be used to store volatile data and perhaps to store instructions that are executed by the processor 410. The ROM 440 is a non-volatile memory device that typically has a smaller memory capacity than the memory capacity of the secondary storage 450. ROM 440 might be used to store instructions and perhaps data that are read during execution of the instructions. Access to both RAM 430 and ROM 440 is typically faster than to secondary storage 450. The secondary storage 450 is typically comprised of one or more disk drives or tape drives and might be used for non-volatile storage of data or as an over-flow data storage device if RAM 430 is not large enough to hold all working data. Secondary storage 450 may be used to store programs that are loaded into RAM 330 when such programs are selected for execution.

The I/O devices 460 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 425 might be considered to be a component of the I/O devices 460 instead of or in addition to being a component of the network connectivity devices 420.

The GPS sensor 480 decodes global positioning system signals, thereby enabling the system 415 to determine its location. The system 415 may also determine its location using the transceiver 425. Location may be determined using Enhanced Observed Time Difference (EOTD), a position-location method wherein the UE triangulates its position using signals received by the transceiver 425. Other common methods of triangulation include Uplink Time Difference of Arrival (U-TDOA), Angle of Arrival (AOA), Location Pattern Matching (LPM) and Advanced Forward Link Trilateration (AFLT).

According to one embodiment, a user equipment (UE) is provided for location request tracking. The UE includes a storage device; a display; a processor configured to receive a location request, store data related to the location request to a location request list stored on the storage device, the location request list maintaining data related to a plurality of location requests, and display the location request data stored in the location request list.

In another embodiment, a network component is provided for location request tracking. The network component includes a storage device and a processor configured to receive a location request for a UE, store data related to the location request to a location request list stored on the storage device, the location request list maintaining data related to a plurality of location requests related to the UE, and display via the display the location request data stored in the location request list.

In another embodiment, a method is provided for tracking location requests. The method includes receiving a location request for a user equipment; storing data related to the location request to a location request list stored on a stored a device, the location request list maintaining data related to a plurality of requests for the location of the UE; and displaying the location request data stored in the location request list.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile user equipment, comprising:
a processor configured to:
  receive a location request;
  store, to a location request list on the user equipment, first data related to the location request, the location request list maintaining information related to a plurality of location requests;
  retrieve, from another location request list managed by a network server, second data related to another location request that was not received by the user equipment when the user equipment was either outside of coverage, roaming or turned off;
  combine, in the location request list on the user equipment, the second data with the first data;
  automatically or periodically synchronize location request data stored on the user equipment and on the network server; and
  wherein the first data indicates whether a verification notification is to be provided to the network server relative to the location request that was received.

2. The user equipment of claim 1, wherein the information comprises at least one of an identification of a requestor of the location request, a time of the start of the location request, and a duration of a location service.

3. The user equipment of claim 1, wherein the information comprises at least one of a notification type and a service type.

4. The user equipment of claim 3, wherein the notification type includes a $3^{rd}$ Generation Partnership Project compliant location service notification type including at least one of:
  positioning is not allowed (no notification sent to UE);
  positioning is allowed without notification to UE;
  positioning allowed with notification to the UE;
  positioning requires notification and verification by the UE user, wherein positioning is allowed if granted by the UE user or if there is no response from the user; and positioning requires notification and verification by the UE user, wherein positioning is allowed only if granted by the UE user.

5. The user equipment of claim 3, wherein the service type includes whether the location service is ongoing or completed.

6. The user equipment of claim 1 wherein the processor is further configured to display the information related to the plurality of location requests.

7. The user equipment of claim 1 wherein the processor is further configured to promote cancellation of an ongoing location request service.

8. A network component in a telecommunications network, comprising:
   a processor configured to:
   receive a location request for a user equipment (UE);
   store, to a location request list on the network component, first data related to the location request, the location request list maintaining information related to a plurality of location requests received by the network component on behalf of the UE;
   transmit the first data to the UE;
   receive another location request for the UE;
   store, to the location request list on the network component, second data related to the another location request;
   determine that the UE is either outside of coverage, roaming or turned off according to a failed attempt to communicate the second data to the UE;
   provide, relative to a request from the UE after the failed attempt, the second data to the UE; and
   automatically or periodically synchronize location request data stored on the network server and on the user equipment;
   wherein the first data indicates whether a verification notification is to be provided to the network server relative to the location request that was received.

9. The network component of claim 8, wherein the information comprises at least one of an identification of a requestor of the location request, a time of the start of the location request, and a duration of a location service.

10. The network component of claim 8, wherein the information comprises at least one of a notification type and a service type.

11. The network component of claim 10, wherein the notification type includes a $3^{rd}$ Generation Partnership Project compliant location service notification type including at least one of:
   positioning is not allowed (no notification sent to UE);
   positioning is allowed without notification to UE;
   positioning allowed with notification to the UE;
   positioning requires notification and verification by the UE user, wherein positioning is allowed if granted by the UE user or if there is no response from the user; and
   positioning requires notification and verification by the UE user, wherein positioning is allowed only if granted by the UE user.

12. The network component of claim 10, wherein the service type includes whether the location service is ongoing or completed.

13. A non-transitory computer-readable medium in a telecommunications network, having stored thereon computer-readable instructions to cause performance of a method comprising:
   receiving a location request for a user equipment (UE);
   storing, to a location request list on a network component, first data related to the location request, the location request list maintaining information related to a plurality of location requests received by the network component on behalf of the UE;
   transmitting the first data to the UE;
   receiving another location request for the UE;
   storing, to the location request list on the network component, second data related to the another location request;
   determining that the UE is either outside of coverage, roaming or turned off according to a failed attempt to communicate the second data to the UE;
   providing, relative to a request from the UE after the failed attempt, the second data to the UE; and
   automatically or periodically synchronize location request data stored on the on the network server and on the user equipment;
   wherein the first data indicates whether a verification notification is to be provided to the network server relative to the location request that was received.

14. The non-transitory computer-readable medium of claim 13, wherein the information comprises at least one of an identification of a requestor of the location request, a time of the start of the location request, and a duration of a location service.

15. The non-transitory computer-readable medium of claim 13, wherein the information comprises at least one of a notification type and a service type.

16. The non-transitory computer-readable medium of claim 15, wherein the notification type includes a $3^{rd}$ Generation Partnership Project compliant location service notification type including at least one of:
   positioning is not allowed (no notification sent to UE);
   positioning is allowed without notification to UE;
   positioning allowed with notification to the UE;
   positioning requires notification and verification by the UE user, wherein positioning is allowed if granted by the UE user or if there is no response from the user; and
   positioning requires notification and verification by the UE user, wherein positioning is allowed only if granted by the UE user.

17. The non-transitory computer-readable medium of claim 15, wherein the service type includes whether the location service is ongoing or completed.

* * * * *